(12) United States Patent
Hogbring

(10) Patent No.: US 7,537,127 B2
(45) Date of Patent: May 26, 2009

(54) TOWING ARRANGEMENT AND DEFORMATION TUBE IN A RAILWAY VEHICLE COUPLING

(75) Inventor: Magnus Hogbring, Falun (SE)

(73) Assignee: Dellner Couplers AB, Falun (SE)

(*) Notice: Subject to any disclaimer, the term of this patent is extended or adjusted under 35 U.S.C. 154(b) by 136 days.

(21) Appl. No.: 10/588,306

(22) PCT Filed: Jan. 25, 2005

(86) PCT No.: PCT/SE2005/000071

§ 371 (c)(1),
(2), (4) Date: Sep. 8, 2006

(87) PCT Pub. No.: WO2005/075272

PCT Pub. Date: Aug. 18, 2005

(65) Prior Publication Data

US 2007/0175851 A1  Aug. 2, 2007

(30) Foreign Application Priority Data

Feb. 4, 2004  (SE) .................................. 0400215

(51) Int. Cl.
*B61G 9/00* (2006.01)
*B61G 7/10* (2006.01)
*B61G 5/00* (2006.01)
(52) U.S. Cl. .................. 213/62 R; 213/10; 213/50; 213/75 R
(58) Field of Classification Search ............ 213/50–59, 213/10, 60, 61; 280/495, 497, 503, 504
See application file for complete search history.

(56) References Cited

U.S. PATENT DOCUMENTS

| 1,801,332 | A | * | 4/1931 | Clausen et al. ............... 105/420 |
| 2,722,897 | A | * | 11/1955 | Morey .......................... 105/73 |
| 2,886,188 | A | * | 5/1959 | Steins .......................... 213/51 |
| 3,587,869 | A | * | 6/1971 | Atkinson et al. ............... 213/8 |
| 3,913,747 | A | * | 10/1975 | Crummett ....................... 213/8 |
| 3,994,402 | A | * | 11/1976 | Young .......................... 213/50.5 |
| 4,344,541 | A | * | 8/1982 | Chierici ........................ 213/61 |
| 4,555,033 | A | * | 11/1985 | Miller .......................... 213/51 |
| 4,570,807 | A | * | 2/1986 | Miller et al. ................... 213/60 |

(Continued)

FOREIGN PATENT DOCUMENTS

EP  1247716 A1 * 10/2002

(Continued)

*Primary Examiner*—S. Joseph Morano
*Assistant Examiner*—Jason C Smith
(74) *Attorney, Agent, or Firm*—Young & Thompson

(57) ABSTRACT

A towing arrangement intended for train couplers includes a bar (8), which at a rear end has an axially projecting pin (10), which projects through a through hole (40) in a plate (11), which on both sides is surrounded by shock-absorbing spring members (12), which always aim to hold the pin in a starting position in relation to the plate, and against the action of which the pin together with the bar are axially movable. The plate (11) is included in a mandrel (16) equipped with a cone (19), which mandrel is inserted into a deformation tube (17), more precisely into a wide, front tube section (22), which via a waist (23) transforms into a thinner, rear tube section (21), which is deformable by the mandrel (16). A deformation tube is also described.

8 Claims, 3 Drawing Sheets

U.S. PATENT DOCUMENTS

Figure 1:
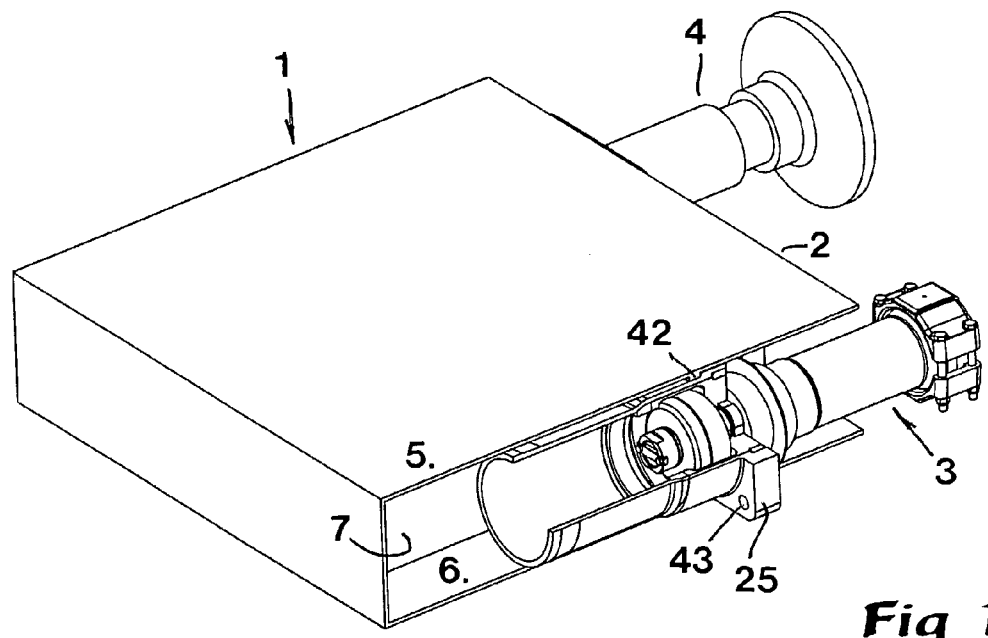

| | | | |
|---|---|---|---|
| 4,573,594 A * | 3/1986 | Kunst et al. | 213/51 |
| 4,681,040 A * | 7/1987 | Brodeur et al. | 105/3 |
| 4,776,474 A * | 10/1988 | Terlecky et al. | 213/64 |
| 4,848,611 A * | 7/1989 | Terlecky et al. | 213/64 |
| RE33,012 E * | 8/1989 | Howard | 280/432 |
| 5,176,268 A * | 1/1993 | Manley | 213/56 |
| 5,305,899 A * | 4/1994 | Kaufhold | 213/50 |
| 5,312,007 A * | 5/1994 | Kaufhold et al. | 213/75 R |
| 5,360,124 A * | 11/1994 | Wurzer et al. | 213/62 R |
| 5,360,125 A * | 11/1994 | Dawson et al. | 213/62 R |
| 6,446,820 B1 * | 9/2002 | Barker et al. | 213/75 R |
| 6,712,231 B1 * | 3/2004 | Ernst et al. | 213/75 R |
| 2007/0125739 A1* | 6/2007 | Hogbring et al. | 213/75 R |
| 2007/0175851 A1* | 8/2007 | Hogbring | 213/62 R |
| 2008/0012335 A1* | 1/2008 | Westman et al. | 285/406 |

FOREIGN PATENT DOCUMENTS

EP             1312527 A1 *  5/2003

* cited by examiner

TOWING ARRANGEMENT AND DEFORMATION TUBE IN A RAILWAY VEHICLE COUPLING

TECHNICAL FIELD OF THE INVENTION

In a first aspect, this invention relates to a towing arrangement being intended for train couplers and of the type that comprises a bar, which at a rear end includes an axially projecting pin, which projects through a through hole in a plate, which on both sides is surrounded by shock-absorbing spring members, which always aim to hold the pin in a starting position in relation to the plate, and against the action of which the pin together with the bar are axially movable.

BACKGROUND OF THE INVENTION

Although arrangements of the above-mentioned type in practice have the purpose of, between different wheel-supported units, such as cars and/or locomotives, in a train unit transferring not only tractive forces but also thrust forces, the same are commonly denominated "towing arrangements" by those skilled in the art. Characteristic of such towing arrangements is that the same include a bar or registration arm (usually in the form of a tube), which at a rear end in one way or the other is fixed in one of the ends of a frame included in the vehicle unit in question, and which at a front end is connected to one or more additional details while forming a coupler. For instance, the front end of the bar may be directly connected to a coupler head and together with the same form an automatic coupler, but it may also via a muff coupling or the like be connected to a collision protection, which in turn is connected to a coupler head. In the towing arrangement, means are also included in order to absorb shocks of moderate character, i.e., such shock motions that every day arise and are transferred between the vehicle units during travel as well as in connection with coupling of the vehicle units.

DESCRIPTION OF PRIOR ART

In the market, a plurality of different types of towing arrangements are found, the kind initially mentioned of which makes use of spring members as shock-absorbing means. More precisely, one or more spring members are arranged on both sides of a plate having a through hole, in which a pin is inserted that protrudes axially from the rear end of the bar or registration arm of the towing arrangement. These spring members, which for instance may be composed of cushions or bodies of an elastic material, always aim to hold the pin, and thereby the bar, in a given starting position as long as the arrangement is not influenced by any appreciable shock motions, but as soon as shocks arise and manifest themselves in tractive motions in one direction and thrust motions in the opposite direction, these motions are absorbed by the spring members on both sides of the plate. A coupler assembled of just one such towing arrangement and a coupler head can of course absorb mild shocks and vibrations, but not such extreme shock forces that may arise in connection with collisions. Recently, demands have more and more often been raised that the couplers should be provided with particular collision protections, i.e., means, which in contrast to ordinary shock absorbers, have the capability of extincting extreme amounts of kinetic energy with the purpose of reducing and abating to the greatest possible extent the resulting effects in connection with strong collisions. If the couplers should be equipped with such collision protections, previously it has been necessary to place the means serving as collision protection in extension of the proper towing arrangement. In practice, a deformation tube is usually inserted between the towing arrangement and a coupler head. An aggravating disadvantage of this solution is, however, that the collision protection is based on the length, i.e., requires that the coupler in its entirety is given a great length. Furthermore, the solution is manufacturing-wise cost-demanding and results in difficulties with the construction in other respects.

OBJECTS AND FEATURES OF THE INVENTION

The present invention aims at obviating the above-mentioned problems and at providing an improved towing arrangement for train couplers. Therefore, a primary object of the invention is—in a first aspect—to provide a towing arrangement, in which a collision protection function is integrated in the proper towing arrangement. In other words, a coupler, which makes use of the towing arrangement according to the invention, should be able to assimilate and extinguish such extreme amounts of energy that arise upon collisions, without particular collision protection means needing to be inserted between, for instance, a coupler head and the towing arrangement. An additional object is to provide a towing arrangement that is structurally simple and thereby inexpensive to manufacture. Yet an object of the invention is to provide a towing arrangement, which after the occurrence of an accident has good chances to be restorable at a moderate cost.

FURTHER ELUCIDATION OF PRIOR ART

A collision protection in the form of a tube, which is deformable by means of a mandrel equipped with a cone, is previously known per se by EP 1 312 527. However, in this case, the collision protection is built-in in a link coupling, which lacks any shock-absorbing spring member of the type that characterizes the towing arrangement according to the present invention.

BRIEF DESCRIPTION OF THE APPENDED DRAWINGS

Figure 2:
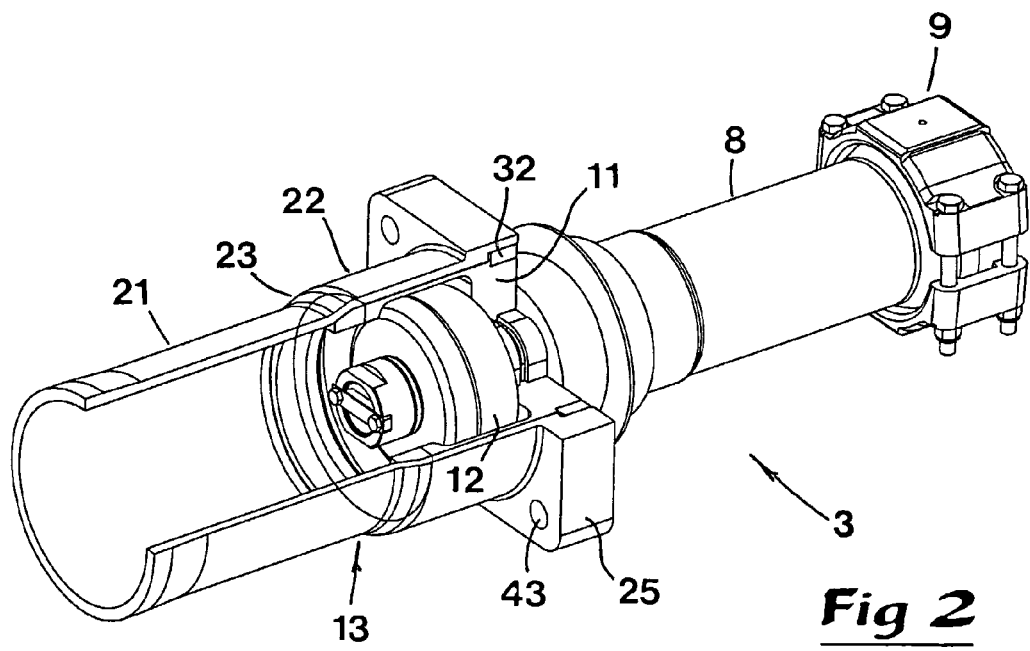
Figure 3:
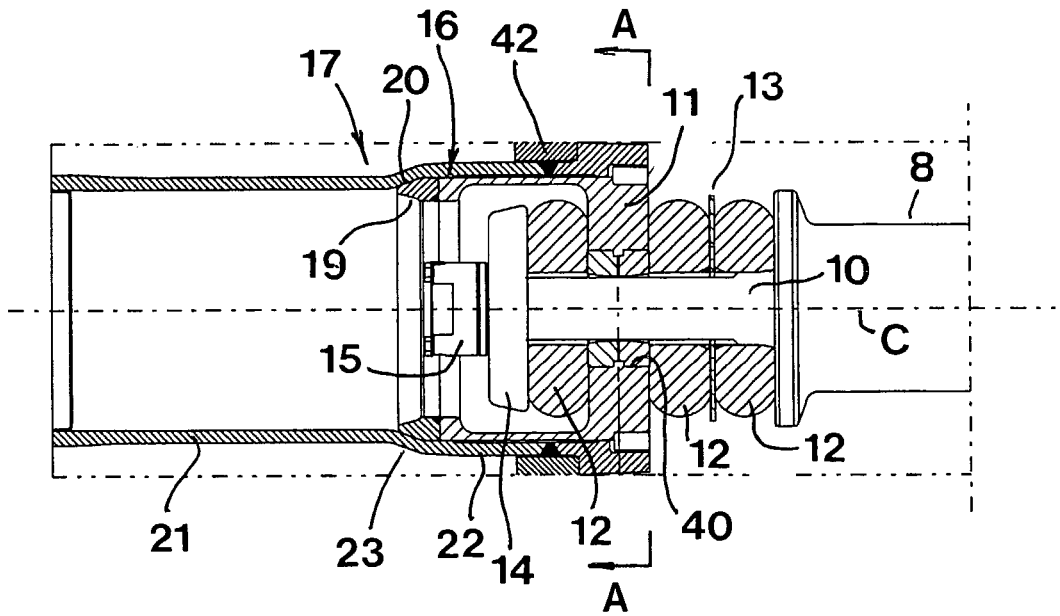
Figure 4:
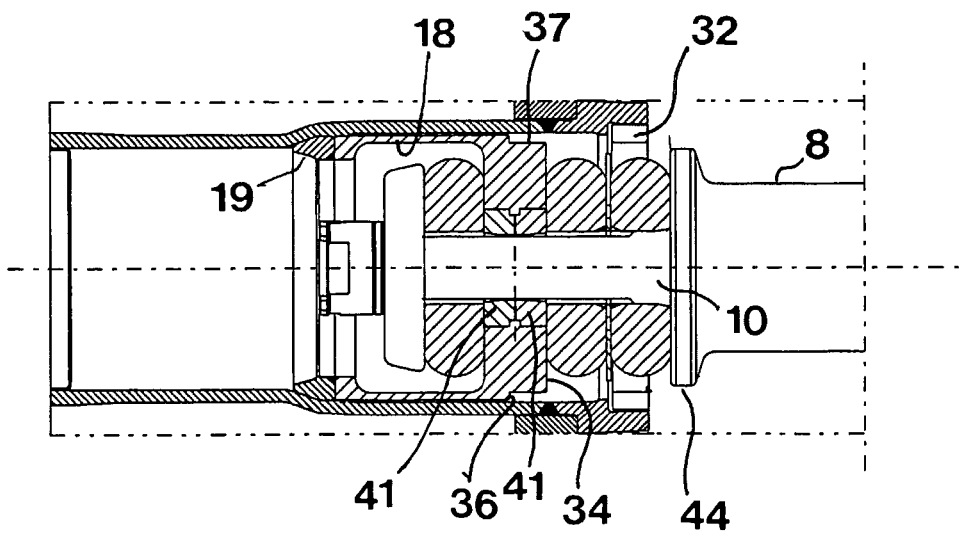
Figure 5:
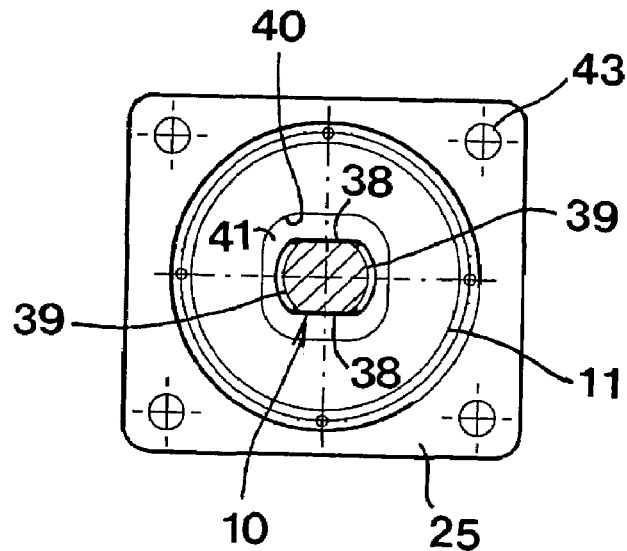
Figure 6:
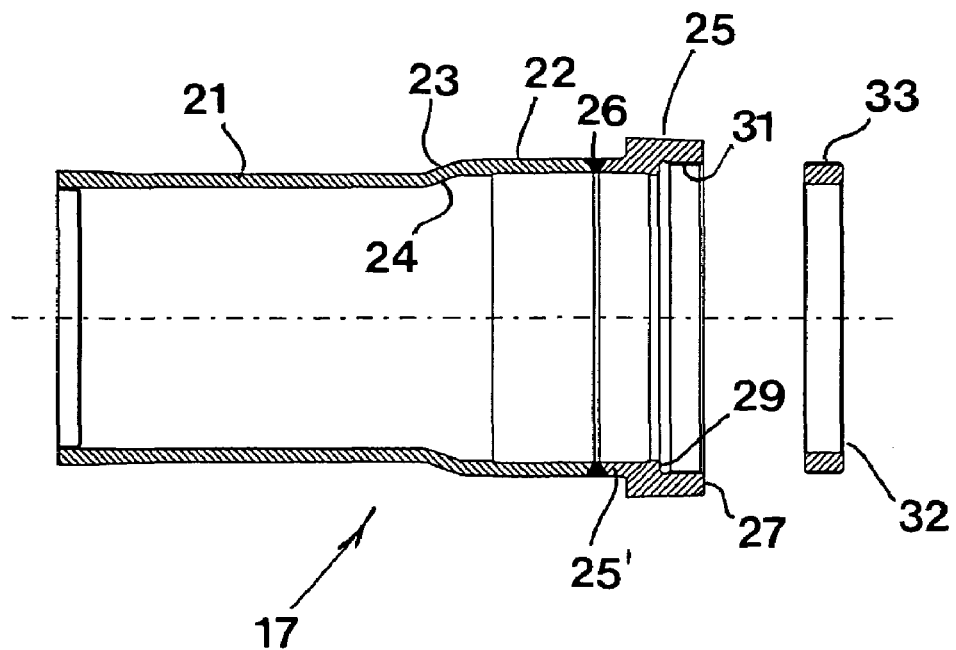

In the drawings:

FIG. 1 is a partially cut perspective view showing a towing arrangement made in accordance with the invention and mounted in a frame of a railroad car, FIG. 2 is an enlarged, partly cut perspective view of solely the towing arrangement, FIG. 3 is an enlarged, partial longitudinal section through the towing arrangement shown in a primed starting position, FIG. 4 is an analogous longitudinal section showing the towing arrangement after triggering of the collision protection, FIG. 5 is an end view A-A in FIG. 3, and FIG. 6 is a longitudinal section through a deformation tube included in the towing arrangement.

DETAILED DESCRIPTION OF A PREFERRED EMBODIMENT OF THE INVENTION

In FIG. 1, 1 generally designates a frame of the type that is included in any vehicle unit (e.g., a car, a locomotive or the like), and which together with other vehicle units may form a train unit. By those skilled in the art, the frame is at times also denominated body or chassis. At one end 2 of the frame, a towing arrangement in its entirety designated 3 is mounted, as well as two dead blocks 4, only one of which is shown in FIG. 1. In the shown frame, two plates or panels 5, 6 are included, between which a hollow space 7 is defined. In this hollow space, a rear part of the towing arrangement 3 is accommodated, while a front part of the same protrudes a distance from the end 2 of the frame. In this connection, it should be made clear that the concepts "front" and "rear", respectively, relate to the proper towing arrangement and not to the frame. In other words, for the chosen terminology, it is insignificant whether the end 2 of the car is turned forward or rearward in the train unit.

A substantial part of the towing arrangement 3 consists of a bar or registration arm 8, which in practice consists of a cylindrical tube. In the example, adjacent to the front end of the bar 8, a muff coupling 9 is shown having the purpose of interconnecting the bar and another component, e.g., a coupler head, for the formation of an automatic coupler. From the rear end of the bar 8 (see FIGS. 3 and 4), a pin 10 protrudes, which is thinner than the bar 8 and concentric with the geometrical centre axis C of the bar. The pin 10 projects through a hole 40 in a plate designated 11. On both sides of this plate, shock absorbers or shock-absorbing spring members 12 are arranged, which advantageously may consist of cushions or bodies of an elastically deformable material, but which also could consist of mechanical compression springs, e.g., cup springs or screw springs. More precisely, one such spring member 12 is placed on the back side of the plate 11, while two spring members 12 are present on the front side and are mutually spaced-apart by a washer 13. Against the rear spring member 12, a disc 14 is pressed. By means of a retaining element 15, e.g., nut, the disc 14 is kept pressed against the spring member 12 by a predetermined pressure, which yields the desired degree of compression in the spring members 12.

As far as the shown towing arrangement has been described hitherto, the same is in all essentials previously known. However, in previously known towing arrangements of this type, the plate 11 has served as a fastener, which has been fixed directly in the frame of the car or the vehicle unit. In doing so, the towing arrangement has in a satisfying way met not only the purpose of, between connected cars, transferring tractive as well as thrust forces, but also the purpose of absorbing and abating such moderate shock motions that permanently occur during, for instance, travel. However, the towing arrangement has not had any capability of extinguishing such amounts of kinetic energy that arise in connection with possible collisions.

Characteristic of the present invention is that the above-mentioned plate 11 is included in a mandrel in its entirety designated 16, which is inserted into a deformable tube 17, below denominated deformation tube. The mandrel 16 includes, in addition to the plate 11, a cylinder 18 extending rearward from the same, which cylinder at the rear end thereof has a cone designated 19. In the shown, preferred embodiment, the plate 11 and the cylinder 18 are made integrally from a first material, e.g., cast iron. The component made in this way has a shape similar to a barrel. The cone 19 consists in turn of a ring that is of a second material and formed with a conical surface 20, which second material has greater compression strength than the material in the barrel-like component 11, 18. Advantageously, the ring 19 may be manufactured from hardened steel, the ring permanently being united to the cylinder 18, e.g., by welding. The cone angle of the conical surface 20 may advantageously amount to about 40° (2×20°).

The deformation tube 17, which is shown separately in FIG. 6, and which is of a cylindrical basic shape, includes a rear section 21, which is spaced apart from a wider, front section 22 via a waist 23, which tapers conically from the wide section 22 toward the thin section 21. It is axiomatic that the inner diameter of the section 22 is larger than the inner diameter of the section 21. More precisely, the inner diameter of the section 22 may correspond with—or be very little larger than—the outer diameter of the mandrel 16, as this is determined primarily by the largest diameter of the cone 19. The inner diameter of the section 21 is, however, considerably smaller than the outer diameter of the cone 19. The interior, conical surface, which defines the waist 23, is designated 24. The cone angle of this surface may advantageously correspond with the cone angle (40°) of the conical surface 20 of the ring 19. However, minor angle differences are feasible.

At the front end thereof, the deformation tube 17 has a comparatively robust flange 25, which in the example has been made as a separate component, having a pipe socket 25', which has been united to the rest of the deformation tube via a welded joint 26. The flange 25 has a rectangular contour shape and corbels out from the tube section 22, while the inner diameter of the flange and the pipe socket substantially corresponds with the inner diameter of the tube section 22. However, adjacent to the ring-shaped end surface 27 of the flange, a ring-shaped groove is recessed, which is defined by a planar, ring-shaped surface 29 as well as a cylindrical limiting surface. In the shown, preferred embodiment example, a female thread 31 is applied in said cylinder surface, which thread may be formed directly in the flange material or alternatively be made in a particular insert ring, which in turn is fixed against the cylinder surface. The width or axial extension of the proper thread 31 is somewhat smaller than the width or depth of the groove.

Said groove has the purpose of receiving a clamp ring 32 having an external male thread 33.

As is best seen in FIG. 4, a circumferential groove is also formed adjacent to the front side 34 of the plate 11, which groove is defined by a ring-shaped, planar shoulder surface 36 as well as a cylindrical surface 37. The width of this cylinder surface may advantageously correspond with the width of the ring 32 (as this is counted between planar, opposite end surfaces of the ring), but be somewhat smaller than the depth of the groove that is defined in the flange 25.

In FIG. 5 (the cut A-A in FIG. 3), it is seen that the pin 10 has an out of round cross-section shape. More precisely, the shape is defined by two planar, parallel surfaces 38, and two curved surfaces 39. The hole 40 in the plate 11, through which the pin 10 is brought, has a substantially square cross-section shape, and is considerably thicker than the pin 10. As is seen in FIGS. 3 and 4, two insert bodies 41 of an elastically deformable or resilient material, e.g., rubber, are inserted into the hole 40 from opposite directions. In each such insert body 41, a through hole is formed having the same out of round cross-section shape as the pin 10. At least the planar, external surfaces 38 of the pin 10 have fine fit against the corresponding planar inner limiting surfaces in the insert bodies 41. The deformable insert bodies 41 guarantee that the pin 10 normally assumes the rotation angle position that is shown in FIG. 5. However, upon the rather frequent occasions when the bar 8, and thereby the pin 10, is subjected to torsion stresses, the insert bodies permit a certain turning of the pin, although always against the action of the spring force in the material. In other words, the insert bodies form a torsion suspension, which, on one hand, guarantees requisite flexibility in the coupling between two cars, but which on the other hand always brings back the bar (and a coupler head belonging thereto) to a desired starting or normal position.

The Function and Advantages of the Towing Arrangement According to the Invention First, reference is made to FIG. 1, in which the reference designation 42 implies how a vertical wall or panel is fixed in the hollow space 7 of the frame, more precisely at a distance inside the end 2 of the frame. In this panel 42, there is a through, circular opening, the diameter of which is at least somewhat larger than the outer diameter of the coarse section 22 of the deformation tube. Thus, the deformation tube can be inserted through the opening until the flange 25 is pressed against the panel 42. After this, the flange is fixed against the panel by means of suitable fastening elements, e.g., bolts, which are applied in co-operating holes 43 in the flange and the panel, respectively.

When the towing arrangement assumes the starting or normal state thereof (see FIGS. 1-3), the cone 19 of the mandrel 16 is kept pressed, free of play, against the waist 23 of the deformation tube 17. This takes place by means of the clamp ring 32, which via the threaded joint 31, 33 holds the mandrel in a position in which the cone surfaces 20, 24 are pressed against each other by a certain pressure. Clamping of the mandrel may, per se, take place by means of the threaded clamp ring 32 only. However, in practice, it is preferred to press in the mandrel by means of a strong, hydraulic clamping mechanism (not shown), and then the clamp ring is tightened while forming a stop, which makes axial displacement of the mandrel in the forward direction impossible. In other words, the clamp ring holds the mandrel in place inside the wide section 22 of the deformation tube. On the contrary, the clamp ring 32 does not prevent the mandrel from moving axially rearward. Such a move of the mandrel is, however, prevented in the normal state according to FIG. 3 by the waist 23.

In any normal case, e.g., in connection with travel and coupling occasions, respectively, the motion-damping means of the towing arrangement in the form of the spring members 12 and the insert bodies 41, respectively, work in a conventional way, i.e., tractive, thrust and rotary motions in the coupling between two cars are absorbed in a smooth and careful way.

However, if a collision would occur, in particular a collision during travel at high speed, the collision protection, which together is formed by the mandrel 16 and the deformation tube 17, is activated. In the towing arrangement, an interaction of forces of high kinetic energy is then generated, the bar 8 together with the mandrel 16 being applied an aim to penetrate into the deformation tube. Such penetration may take place without hindrance by the clamp ring 32, in that the smooth cylinder surface 37 of the mandrel freely can get loose from the likewise smooth inside of the clamp ring. When the mandrel 16 has left the clamp ring and started to move rearward, as is shown in FIG. 4, the tube 17 is successively deformed during conversion of the kinetic energy into heat energy. In such a way, the kinetic energy is extinguished under quick reduction of the resulting effects of the collision of the cars in the train unit as well as possible passengers therein. In this connection, it should be pointed out that the rear end flange 44 of the bar 8 (see FIG. 4) has an outer diameter that is at least somewhat smaller than the outer diameter of the mandrel 16. This means that the end flange 44 of the bar can follow a deep distance into the deformation tube without being stopped by the same. Depending on the nature of the collision and the size of the shock forces, which are generated in conjunction hereby, the mandrel may penetrate differently deep into the deformation tube before all energy has been extinguished. Thus, in particularly severe cases, the tube may be deformed along the major part of the length thereof.

A substantial advantage of the towing arrangement according to the invention is that the same has an inherent collision protection, which can be realized by structurally simple and inexpensive means. Furthermore, said collision protection function may be integrated in the towing arrangement without the length of the bar projecting from the frame needing to be increased. Thus, the requisite deformation tube can in its entirety be accommodated inside the space already available in the interior of the frame. Another advantage is that the construction of the towing arrangement offers reasonable possibilities of restoring the towing arrangement at low costs after an occurred collision. Thus, it may happen that only the deformation tube is destroyed in connection with the mandrel penetrating into the same and altering the shape thereof during plastic deformation of the material in the tube. However, under favourable circumstances, other components in the arrangement may remain intact, wherein the towing arrangement can be restored to working order by the simple measure of exchanging the deformation tube.

Feasible Modifications of the Invention

The invention is not solely limited to the embodiment described above and shown in the drawings. Thus, the mandrel connected to the bar or the registration arm via the pin may, for instance, be formed in many ways that deviate from the detailed embodiment that has been exemplified in the drawings. The concept "plate", as this is used in the description as well as the claims, should therefore be interpreted in the widest sense. Hence, instead of an equally thick plate, the front part of the mandrel may have any suitable shape, provided that the part in question is suitable for the recession of a through hole for the pin and for the pressing of shock-absorbing spring members against the same.

The invention claimed is:

1. A towing arrangement for a train coupler, comprising:
   a plate (11);
   a bar (8), including an axially projecting pin (10) at a rear end of the bar that projects through a through-hole (40) in the plate (11);
   shock-absorbing spring members (12) supported on the pin (10) on each side of the plate (11), the shock-absorbing members (12) operative to hold the pin in a starting position in relation to the plate, and the pin (10) connected to the bar is axially movable in said through-hole (40) against an operative action of the shock-absorbing members (12); and
   a mandrel (16), including the plate (11) and a cylinder (18), the cylinder extending rearward from the plate and having a cone (19) at a free, rear end opposite the plate, wherein,
   the mandrel (11,18,19) is inserted into a deformation tube (17) that comprises a wide front tube section (22) that transforms, via a waist (23), into a thin rear tube section (21) that is deformable by a penetration of the mandrel axially into the deformation tube (17) in a buff direction, and
   the mandrel (11,18,19) is configured to be positively arrested in a draft direction by a clamp ring (32), the clamp ring (32) being in threaded engagement with the forward end of the deformation tube (17), the clamp ring (32) supporting a shoulder (36) in the forward end of the mandrel (11,18,19) in the draft direction.

2. The towing arrangement according to claim 1, wherein the clamp ring (32) is connected to the deformation tube (17) via a threaded joint in the form of a male thread (33) on the outside of the clamp ring (32) and a female thread (31) on the inside of the deformation tube (17), the clamp ring configured to, in the starting position, hold the cone (19) of the mandrel pressed, and free of play, against the waist (23) between the thin rear tube section (21) and the wide front tube section (22) of the tube.

3. The towing arrangement according to claim 2, wherein the mandrel (16), at a front end (34), has a circumferential groove, into which an internal part of the clamp ring (32) engages.

4. The towing arrangement according to claim 3, wherein,
the plate (11) and the cylinder (18) are made integrally from a first material,
the cone consists of a ring (19) of a second material and formed with a conical surface (20), and
the second material has a greater compression strength than the first material.

5. The towing arrangement according to claim 1, wherein the pin (10) has an out-of-round cross section received in said through-hole (40) by means of inter-positioned insert bodies (41).

6. The towing arrangement according to claim 5, wherein the insert bodies (41) are made of elastically deformable material, and form a torsion suspension urging the bar (8) to assume a neutral rotational position.

7. A deformation tube in a towing arrangement for a train coupler as recited in claim 1, wherein the tube (17) has a cylindrical basic shape, and comprises a rear section (21) configured to transform into a front section (22), wider than the rear section (21), via a conically widening waist (23),
wherein the tube (17) further has a flange (25) united to the rear section (21) configured for the fixation of the deformation tube in a frame or chassis of a vehicle unit, and
wherein the tube (17) has, internally in the front section, means (31) to secure the clamp ring (32) in threaded engagement with the tube.

8. The deformation tube according to claim 7, wherein said means consists of a female thread (31) arranged to co-operate with a male thread (33) of the clamp ring (32).

* * * * *